A. LOOMIS.
TRANSMISSION MECHANISM FOR MOTOR VEHICLES.
APPLICATION FILED NOV. 3, 1910.
1,157,015.
Patented Oct. 19, 1915.
2 SHEETS—SHEET 2.
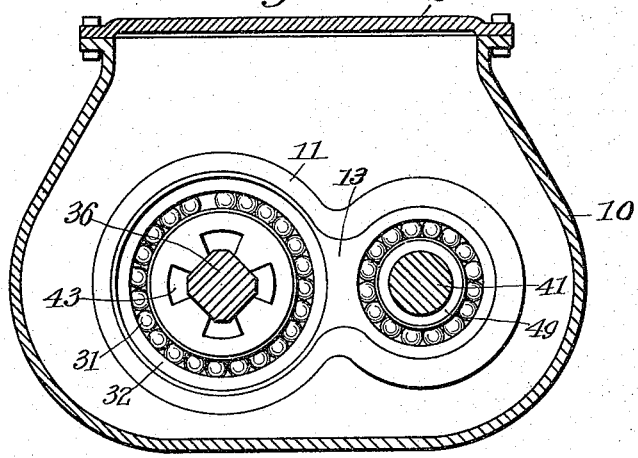
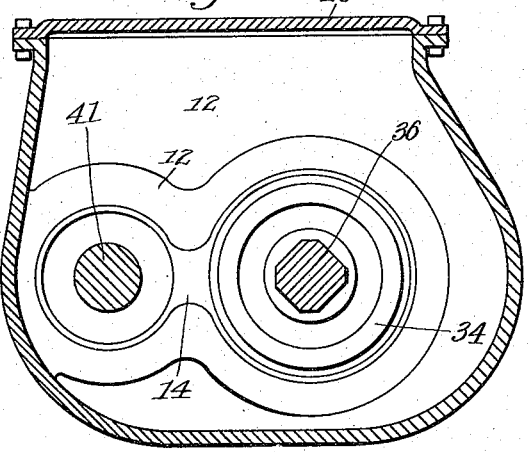
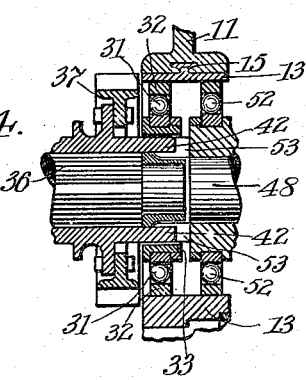
Witnesses:
W. H. Finckel Jr.
C. I. Dale
Inventor:
Allen Loomis,
by Milton Tibbetts,
Attorney.

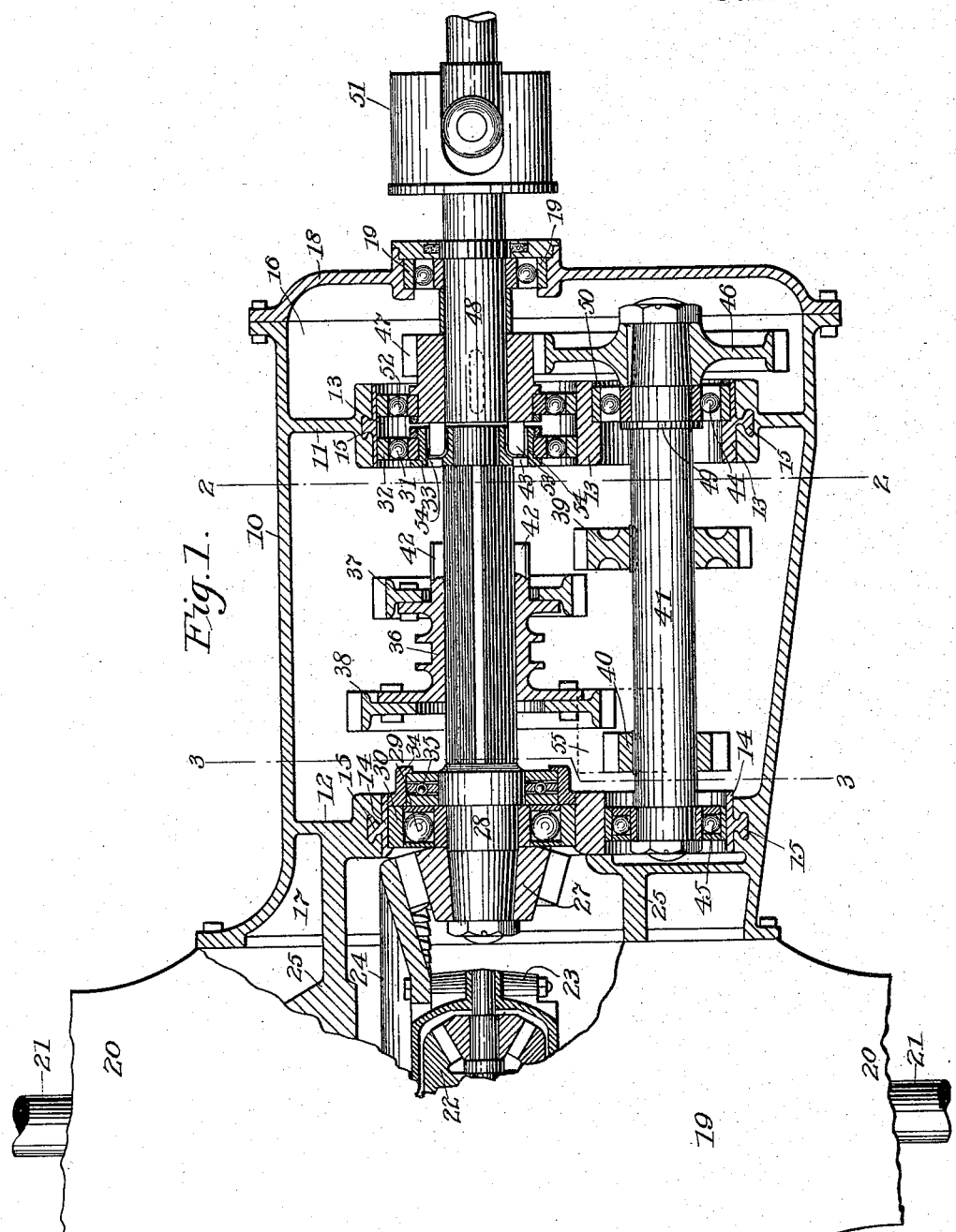

UNITED STATES PATENT OFFICE.

ALLEN LOOMIS, OF DETROIT, MICHIGAN, ASSIGNOR TO PACKARD MOTOR CAR COMPANY, OF DETROIT, MICHIGAN, A CORPORATION OF MICHIGAN.

TRANSMISSION MECHANISM FOR MOTOR-VEHICLES.

1,157,015.  Specification of Letters Patent.  Patented Oct. 19, 1915.

Application filed November 3, 1910. Serial No. 590,583.

*To all whom it may concern:*

Be it known that I, ALLEN LOOMIS, a citizen of the United States, and resident of Detroit, Wayne county, State of Michigan, have invented certain new and useful Improvements in Transmission Mechanism for Motor-Vehicles, of which the following is a specification.

This invention relates to transmission mechanism for motor vehicles and particularly to the change speed gearing usually employed between the motor and rear axle of a motor vehicle.

In the construction of the modern automobile one of the chief considerations is quietness of the operating parts, and one of the most troublesome parts in this respect is the gear box. To attain quietness of bevel and spur gears it is absolutely necessary, in addition to having the gears cut correctly, to have them mounted in perfect alinement and in bearings that permit of practically no play. It is, of course, impossible to produce a bearing that has absolutely no play, so that it becomes the aim of every designer to so place his bearings and gears that the play in the bearings will produce the least amount of play in the gears, that is, he works to eliminate magnifying the play as is the case where a gear is mounted on one end of a shaft and the shaft is supported on a pair of bearings, both of which are separated from the gear. Any radial thrust on the gear then causes play of the shaft several times that of the combined play in the two bearings, depending of course upon the distance the gear is set away from its nearest bearing and the distance the bearings are separated from each other. It is also desirable to have every annular bearing set directly in the casing or other supporting structure, or in other words, it is undesirable to have one shaft mounted in bearings in a second alined shaft and said second shaft mounted in the casing. In this latter structure the gears are subjected to the combined play of the two bearings. It is undesirable also to mount the outer ring of an annular ball bearing in a collar screwed into the casing for the reason that it is impossible to thread the necessary large opening and the collar accurately enough to give good results. The cutting die will frequently find one side softer than the other and the result is an eccentric bearing.

The present invention is designed to overcome the various objectionable features outlined above, and the structure by which the objects of the invention are obtained will be described in connection with the accompanying drawings, in which—

Figure 1 is a horizontal sectional view through a motor vehicle transmission mechanism with the differential casing in plan; Fig. 2 is a transverse section on the line 2—2 of Fig. 1; Fig. 3 is a transverse section on the line 3—3 of Fig. 1; and Fig. 4 is a fragmentary view showing the gears of Fig. 1 in direct driving position.

Referring to the drawings, 10 represents the main supporting structure or casing of the transmission mechanism, which casing is tubular in form and provided adjacent its ends with transverse walls 11 and 12, which walls form supports for the bearings of the change speed gearing.

Cast or otherwise rigidly secured in the walls 11, 12, are steel supporting members 13, 14, of S-shape, the two annular openings in each of these supports being machined out to receive the bearings of the change speed gearing as will be more fully hereinafter described. As shown, these supporting members are provided with integral dove tails 15 whereby the cast metal of the casing 10 securely locks the supporting members in place and they thereby become as an integral part of the casing. This arrangement is such that the supporting members 13, 14, may be machined after the casing 10 has been made and the openings for the bearings will therefore be true as nearly as it is possible to make them with accurate machining. This construction permits of using aluminum for the main part of the casing with a harder metal such as steel for the bearing supporting members.

The casing 10 is formed with open ends 16, 17, and the former is closed by a removable cover 18 in which is a bearing 19 coaxial with one of the openings in the supporting member 13. The rear end 17 of the casing is closed by the differential casing 19, which latter casing has laterally extending sleeves 20 forming the stationary rear axle or jack shaft of the motor vehicle. The axle sections 21 extend into this casing and are suitably connected with the differential gearing 22, upon the housing 23 of which is secured the bevel driving gear 24. The differential housing may be supported in bearings in lugs 25 extending rearwardly from the casing 10 thereby insuring proper alinement with the bearings of the change speed gearing. It will be understood that the casing 10 is provided with a suitable detachable cover 26 in the upper wall thereof for assembling and removing the gears and shafts arranged between the walls 11, 12.

Arranged to mesh with the gear 24 is a driving pinion 27 secured on the end of the driven shaft 28 which shaft is supported in an annular ball bearing 29, the outer ring 30 of which rests directly in one of the openings in the supporting member 14, and an annular ball bearing 31, the outer ring 32 of which rests directly in the supporting member 13, as will be clearly seen from the drawings. The inner ring of the bearing 31 may rest upon an integral part of the shaft 28, which part would preferably be in the form of a flange, or an annulus 33 may be secured to the end of the shaft 28, as by pressing it thereon so that it will turn with the shaft, for the purpose of seating the bearing 31. It will be understood that in the event the annulus 33 is formed integral with the shaft 28, the other end of the shaft will be machined small enough to permit the sliding gears, hereinafter referred to, to be assembled from that end. The annular bearing 29 is retained in place by a ring 34 threaded into the member 14 and a thrust bearing 35 is also retained thereby for the purpose of taking the end thrust of the pinion 27. It will thus be seen that the driven shaft 28 upon which the driving pinion 27 is mounted, is supported in comparatively widely separated bearings of ample size directly in the walls of the casing 10, the bearings resting in the steel supporting members 13, 14, which are machined true in the casing. Perfect alinement is thereby secured and the least amount of play possible is allowed the pinion 27.

Between its supporting bearings the shaft 28 is preferably squared or otherwise provided with key-ways and upon this part of the shaft is a shiftable member 36 having a squared opening whereby it is caused to turn with the shaft 28 and permitted to slide thereon. On the member 36 are mounted gears 37 and 38 which are adapted to mesh respectively and at different times with gears 39 and 40 on the countershaft 41. The member 36 is also provided on its forward end with jaws 42 which are adapted to extend through openings 43 formed in line therewith in the web of the annulus 33. The countershaft 41 is mounted in bearings 44 and 45 in the other openings of the supporting members 13, 14, and on the forward end of this shaft which projects through the wall 11 is a gear 46 which meshes constantly with a gear 47 on the driving shaft 48. The countershaft is retained against endwise movement by securing the inner race of the bearing 44 between a flange 49 and the gear 46 on the countershaft and securing the outer race between a shoulder on the supporting member 13 and a ring 50 threaded into said supporting member. Thus it will be seen that the bearings 44, 45, of the countershaft are also supported directly in the members 13, 14, similar to the method of supporting the shaft 28.

The driving shaft 48 with the universal joint 51 on its forward end is supported in the bearing 19 heretofore referred to and in a bearing 52 in the supporting member 13. As heretofore suggested, this shaft 48 is in direct alinement with the shaft 28, and besides having the gear 47 keyed thereon it is also provided with clutching jaws 53 which are shown extending into an annular recess 54 formed in the annulus 33, thus arranging the jaws adjacent the openings 43 in said annulus. With this arrangement of bearings it will be seen that the driving shaft 48 and the driven shaft 28 are supported independently of each other and the bearings for both shafts are sufficiently separated to insure proper alinement, the bearings for the shaft 48 being mounted in the casing on opposite sides of the constant mesh gear 47, and one of them being between said gear and the clutching jaws 53.

From the above it will be observed that the sliding member 36 may be moved to the left to mesh the gear 38 with the gear 40 whereby the shaft 28 will be driven through gears 47, 46, 40 and 38 at a considerably reduced speed; that the sliding member 36 may be moved to the right to mesh the gear 37 with the gear 39 whereby the shaft 48 will drive the shaft 28 through gears 47, 46, 39 and 37 at a lesser reduced speed; and that the sliding member 36 may be moved farther to the right so that the gears 37 and 38 are out of mesh and the jaws 42 extend through the openings 43 and engage the clutching jaws 53 of the shaft 48 within the bearing 31, whereby the shaft 28 is directly driven by the shaft 48 and the countershaft 41 runs idle. It will be understood that the member 36 may be moved to its various positions by suitable connections, not shown.

A reverse gear 55 is shown in dotted lines and is arranged to be moved to position to simultaneously mesh with the gears 38 and 40 when these gears are in the neutral position shown in the drawing, thereby driving the shaft 28 at a reduced speed in the reverse direction from the shaft 48. Connections, not shown, for moving the reverse gear, may be provided.

Having thus described my invention, what I claim is:

1. In a transmission mechanism for motor vehicles, the combination of a casing having transverse end walls and a transverse intermediate wall, alined driving and driven shafts mounted independently in bearings in the end walls and intermediate wall, a countershaft mounted in the casing, gears connecting said shafts and including sliding gears adapted to move into and out of mesh, and means for directly connecting said alined shafts.

2. In a transmission mechanism for motor vehicles, the combination of a casing having transverse end walls and a transverse intermediate wall, alined driving and driven shafts mounted independently in bearings in the end walls and intermediate wall, a counter-shaft mounted in the casing, gears connecting said shafts and including sliding gears adapted to move into and out of mesh, and means shiftable with said sliding gears for directly connecting said alined shafts when said sliding gears are out of mesh.

3. In a transmission mechanism for motor vehicles, the combination of a casing having transverse end walls and a transverse intermediate wall, alined driving and driven shafts mounted independently in bearings in the end walls and intermediate wall, a counter-shaft mounted in the casing, gears connecting said shafts and including sliding gears adapted to move into and out of mesh, and a clutch operated by said sliding gears for connecting said alined shafts for direct drive of one by the other.

4. In a transmission mechanism for motor vehicles, the combination with a driving shaft, an alined driven shaft, a shiftable member on the driven shaft adapted to connect said shafts for direct transmission, a bevel pinion on said driven shaft, and a bevel gear in mesh therewith, of a casing for the gearing, and bearings in the casing for said driven shaft on either side of said shiftable member.

5. In a transmission mechanism for motor vehicles, the combination with a casing, of a driving shaft in said casing adjacent one end thereof, an alined driven shaft, a shiftable member on the driven shaft adapted to connect said shafts for direct transmission, a bevel pinion on said driven shaft, a bevel gear in mesh therewith, and bearings in the casing for said driven shaft on either side of said shiftable member.

6. In a transmission mechanism for motor vehicles, the combination with a casing, of gearing mounted therein comprising a bevel pinion, a bevel gear meshing therewith, a gear shaft upon which said pinion is secured, sliding gears on said gear shaft, a driving shaft in said casing alined with said gear shaft, a direct drive clutch between said shafts and bearings in the casing for said gear shaft on either side of said sliding gears.

7. In a transmission mechanism for motor vehicles, the combination with a driving shaft, an alined driven shaft, means for directly connecting and disconnecting said shafts and a counter shaft, of constantly meshing gears on the driving and counter shafts, a second gear on the countershaft, a sliding gear on the driven shaft adapted to mesh with said second gear, and a bearing at each end of the driven shaft independent of the driving shaft.

8. In a transmission mechanism for motor vehicles, the combination with a driving shaft, an alined driven shaft, means for directly connecting and disconnecting said shafts and a counter shaft, of constantly meshing gears on the driving and counter shafts, a second gear on the counter-shaft, a sliding gear on the driven shaft adapted to mesh with said second gear, and a bearing for the end of the driven shaft adjacent the driving shaft but independent thereof.

9. In a transmission mechanism for motor vehicles, the combination with a casing having separated transverse walls therein, of alined driving and driven shafts, a countershaft, gears on the shafts, bearings in the casing walls supporting both ends of the driven and counter shafts independently of the driving shaft, and means for connecting the alined shafts to drive direct.

10. In a transmission mechanism for motor vehicles, the combination with a casing having transverse walls and an end cover, of change speed gearing in the casing comprising alined driving and driven shafts, gears on said shafts, bearings for said shafts in said casing walls and cover, the bearings of each shaft being mounted in the casing independently of those of the other shaft, and means for connecting the alined shafts to drive direct.

11. In a transmission mechanism for motor vehicles, the combination with a casing having bearing supporting walls, of alined driving and driven shafts and a counter shaft, gears on the shafts, bearings in the casing walls for supporting independently the adjacent ends of the alined shafts, and means for connecting the alined shafts for direct drive from one to the other.

12. In a transmission mechanism for motor vehicles, the combination with a driving shaft, a driven shaft alined therewith, a pair of separated bearings for the driving shaft, and a pair of separated bearings for the driven shaft, one of the bearings of one of said shafts being mounted adjacent, but independently of, one of the bearings of the other shaft, of a casing, means in the casing for supporting said bearings, and means for connecting the shafts for direct drive.

13. In a transmission mechanism for motor vehicles, the combination with a casing having bearing supporting walls, of alined driving and driven shafts and a counter shaft, gears on the shafts, bearings in the casing walls for directly supporting both ends of the alined shafts, and means for connecting the alined shafts for direct drive from one to the other.

14. In a transmission mechanism for motor vehicles, the combination with a casing having bearing supporting walls, of alined driving and driven shafts and a counter shaft, gears on the shafts, bearings in the casing walls for supporting the remote ends of the alined shafts, bearings for directly and independently supporting the adjacent ends of the alined shafts, and a clutch operating within said latter bearings for directly connecting the alined shafts.

15. In a transmission mechanism for motor vehicles, the combination with a driving shaft, a driven shaft alined therewith, a counter shaft, gears on said shafts, and bearings for said shafts, of a bearing supporting member arranged to independently support one of the bearings for each of said shafts, and means for directly connecting said alined shafts.

16. In a transmission mechanism for motor vehicles, the combination with a driving shaft, a driven shaft alined therewith, a counter shaft, and gears and bearings for said shafts, of a bearing supporting member arranged to support one of the bearings for each of said shafts, another supporting member arranged to support a bearing for the driven shaft and a bearing for the counter shaft, means for directly connecting the alined shafts, and a casing containing said supporting members.

17. In a transmission mechanism for motor vehicles, the combination with a driving shaft having clutching jaws, and a driven shaft alined therewith, a bearing annulus at one end of said driven shaft and having openings longitudinally of the shafts, of a shiftable member keyed to said driven shaft and having jaws adapted to extend through said openings and clutch with said clutching jaws on the driving shaft.

18. In a transmission mechanism for motor vehicles, the combination with a driving shaft having clutching jaws, a pair of separated bearings therefor, a driven shaft alined therewith, an annulus at one end of said driven shaft and having openings longitudinally of the shafts, and a pair of separated bearings for said driven shaft, one of which bearings is seated upon said annulus, of a shiftable member keyed to said driven shaft and having jaws adapted to extend through said openings and clutch with said clutching jaws on the driving shaft.

19. In a transmission mechanism for motor vehicles, the combination with two alined shafts, an annulus on one of said shafts provided with an opening longitudinally of the shafts, and bearings for said shafts including a bearing seated on said annulus, of a shiftable member on one of said shafts having a jaw adapted to extend through said opening, and a jaw on said other shaft adapted to be clutched by said first jaw.

20. In a transmission mechanism for motor vehicles, the combination of a driving shaft, an alined driven shaft, said shafts being arranged with adjacent ends, supporting bearings for each of said shafts, one of said bearings being arranged adjacent said ends, and a direct drive clutch adapted to connect said shafts, said clutch engaging within said adjacent bearing.

21. In a transmission mechanism for motor vehicles, the combination with a casing having bearing supporting walls, of alined driving and driven shafts having adjacent ends, bearings in the casing walls for supporting the adjacent end of one of the alined shafts, a clutch operating within said latter bearings for directly connecting the said alined shafts, and bearings for the adjacent end of the other of said alined shafts.

22. In a transmission mechanism for motor vehicles, the combination with a casing, a driving shaft, an alined driven shaft, means for connecting and disconnecting said shafts, a countershaft and constantly meshing gears on the driving and countershafts, of bearings for said driving shaft mounted in said casing on opposite sides of said constantly meshing gear on said driving shaft, said bearings being mounted independently of said driven shaft, and bearings in the casing for both ends of the driven shaft.

23. In a transmission mechanism for motor vehicles, the combination of a constant-mesh gear shaft, a shaft alined therewith and supported independently thereof, and a countershaft, constant mesh gears on said constant mesh gear shaft and said counter shaft, relatively sliding gears on said alined shaft and said counter shaft, a direct drive clutch for connecting said constant-mesh gear shaft and said alined shaft, and a supporting bearing for said contant mesh-gear shaft between its constant mesh gear and said clutch.

24. In a transmission mechanism for motor vehicles, the combination of a constant-mesh gear shaft, a shaft alined therewith and supported independently thereof, and a countershaft, constant mesh gears on said constant-mesh gear shaft and said counter shaft, relatively sliding gears on said alined shaft and said counter shaft, a direct drive clutch for connecting said constant-mesh gear shaft and said alined shaft, and a supporting bearing for said constant-mesh gear shaft on either side of its constant mesh gear.

In testimony whereof I affix my signature in presence of two witnesses.

ALLEN LOOMIS.

Witnesses:
GRACE G. LOOMIS,
EDITH HECKMANN.

Copies of this patent may be obtained for five cents each, by addressing the "Commissioner of Patents, Washington, D. C."